(12) United States Patent
Witte

(10) Patent No.: US 11,958,393 B2
(45) Date of Patent: Apr. 16, 2024

(54) SEAT ASSEMBLY FOR A VEHICLE SEAT, METHOD FOR ASSEMBLING A SEAT ASSEMBLY, AND VEHICLE SEAT

(71) Applicant: Adient Engineering and IP GmbH, Burscheid (DE)

(72) Inventor: Stephan Witte, Essen (DE)

(73) Assignee: Adient US LLC, Plymouth, MI (US)

( * ) Notice: Subject to any disclaimer, the term of this patent is extended or adjusted under 35 U.S.C. 154(b) by 357 days.

(21) Appl. No.: 17/420,164

(22) PCT Filed: Jan. 14, 2020

(86) PCT No.: PCT/EP2020/050753
§ 371 (c)(1),
(2) Date: Jul. 1, 2021

(87) PCT Pub. No.: WO2020/148251
PCT Pub. Date: Jul. 23, 2020

(65) Prior Publication Data
US 2022/0089074 A1 Mar. 24, 2022

(30) Foreign Application Priority Data
Jan. 14, 2019 (DE) ..................... 10 2019 100 734.8

(51) Int. Cl.
*B60N 2/72* (2006.01)
*B32B 5/02* (2006.01)
(Continued)

(52) U.S. Cl.
CPC .................. *B60N 2/72* (2013.01); *B32B 5/02* (2013.01); *B32B 5/18* (2013.01); *B32B 5/245* (2013.01);
(Continued)

(58) Field of Classification Search
CPC ........ B60N 2/72; B60N 2/7017; B60N 2/686; B60N 2/5825
(Continued)

(56) References Cited

U.S. PATENT DOCUMENTS 5,067,772 A * 11/1991 Koa ....................... A47C 7/185
297/229
5,887,319 A 3/1999 Smith
(Continued)

FOREIGN PATENT DOCUMENTS

| CN | 1053398 A | 7/1991 |
|----|-----------|--------|
| CN | 102395297 A | 3/2012 |

(Continued)

OTHER PUBLICATIONS

China National Intellectual Property Administration, Office Action in Application No. CN202080009053.3, dated Oct. 21, 2021, 13 pages.
(Continued)

*Primary Examiner* — Milton Nelson, Jr.
(74) *Attorney, Agent, or Firm* — Marshall & Melhorn, LLC

(57) ABSTRACT

A seat assembly for a vehicle seat may have a structural component with multiple reinforcing ribs, a cushion layer, an insert layer which is arranged between the structural component and the cushion layer, at least one component which is secured to the structural component, and at least one securing device. The at least one securing device may secure both the insert part as well as the component to the structural component. A method for assembling such a seat assembly is also described. In one method step, the insert part is secured to the structural component by at least one securing device, and in the same method step or a subsequent method step or a preceding method step the at least
(Continued)

one component is secured to the at least one securing device. A vehicle seat have such a seat assembly is also provided.

14 Claims, 5 Drawing Sheets

(51) Int. Cl.
- *B32B 5/18* (2006.01)
- *B32B 5/24* (2006.01)
- *B32B 9/02* (2006.01)
- *B32B 9/04* (2006.01)
- *B32B 27/06* (2006.01)
- *B32B 27/20* (2006.01)
- *B60N 2/58* (2006.01)
- *B60N 2/68* (2006.01)
- *B60N 2/70* (2006.01)

(52) U.S. Cl.
CPC ............ *B32B 9/025* (2013.01); *B32B 9/046* (2013.01); *B32B 27/065* (2013.01); *B32B 27/20* (2013.01); *B60N 2/5825* (2013.01); *B60N 2/686* (2013.01); *B60N 2/7017* (2013.01); *B32B 2262/101* (2013.01); *B32B 2262/106* (2013.01); *B32B 2266/025* (2013.01); *B32B 2605/003* (2013.01)

(58) Field of Classification Search
USPC .............................. 297/452.6, 411.32, 411.38
See application file for complete search history.

(56) References Cited

U.S. PATENT DOCUMENTS

| | | | |
|---|---|---|---|
| 6,073,996 A * | 6/2000 | Hatsuta | B60N 2/70 156/213 |
| 9,441,763 B2 | 9/2016 | Denner et al. | |
| 2003/0038499 A1* | 2/2003 | Fox | B60R 21/04 296/68.1 |
| 2005/0069398 A1 | 3/2005 | Arbuckle | |
| 2006/0165955 A1 | 7/2006 | Ruegg et al. | |
| 2018/0126885 A1* | 5/2018 | Hartmann | B60N 2/686 |
| 2020/0070697 A1 | 3/2020 | Okuma et al. | |

FOREIGN PATENT DOCUMENTS

| | | |
|---|---|---|
| CN | 105882461 A | 8/2016 |
| CN | 107199928 A | 9/2017 |
| DE | 2001501 A1 | 4/1972 |
| DE | 4033804 A1 | 4/1992 |
| DE | 102006048660 B3 | 11/2007 |
| DE | 102009059975 A1 | 6/2011 |
| DE | 202015001768 U1 | 6/2016 |
| DE | 102016212387 A1 | 11/2017 |
| EP | 2933136 A1 | 10/2015 |
| EP | 2403382 B1 | 7/2016 |
| JP | 3483057 B2 | 1/2004 |

OTHER PUBLICATIONS

European Patent Office, International Search Report and Written Opinion in application No. PCT/ EP2020/050753, dated Apr. 15, 2020, 23 pages, Rijswijk, Netherlands.

* cited by examiner

SEAT ASSEMBLY FOR A VEHICLE SEAT, METHOD FOR ASSEMBLING A SEAT ASSEMBLY, AND VEHICLE SEAT

TITLE

The invention relates to a seat assembly for a vehicle seat, in particular a motor vehicle seat, having a structural component with a plurality of stiffening ribs, an upholstery layer, an insert part which is arranged between the structural component and the upholstery layer, and also at least one component part which is fastened to the structural component. The invention also relates to a method for assembling a seat assembly, and also to a vehicle seat.

BACKGROUND

DE 10 2009 059 975 A1 discloses a seat structure, in particular a seat part or a seat backrest of a single seat or of a rear seat system for a vehicle, which has, as base body, at least one carrier part which can be upholstered and which is composed of a lightweight material. The carrier part is formed from a dimensionally stable nonwoven fabric, which comprises at least one functional element that stiffens the carrier part.

EP 2 403 382 B1 discloses a rear seat, comprising a backrest formed from a first polymer material for supporting an occupant, a reinforcing intermediate layer which is connected to the backrest and which is formed from a second polymer material and a plurality of fibers which are impregnated in the second polymer material.

DE 10 2016 212 387 A1 discloses a seat backrest arrangement, comprising a foam upholstery layer, a supporting sub-arrangement, having a rigid supporting layer which has a multiplicity of cavities and channels formed on a rear surface for the purpose of receiving component parts, and also a generally smooth front surface; at least one component part which is retained in one of the cavities and a second component part which is fastened to the front surface; and also a cover material which covers the upholstery layer and secures the sub-arrangement. The rigid supporting layer is composed of a foamed polypropylene material (EPP).

DE 20 2015 001 768 U1 discloses a fastening clip for a cable harness of a vehicle seat. The fastening clip has a clip foot and a fastening part for fastening the cable harness to the fastening clip.

SUMMARY

The problem addressed by the invention is that of improving a seat assembly. In particular, the intention is to provide a seat assembly having a reduced number of fastening means compared with the prior art. The intention is also to provide a cost-effective method for assembling a seat assembly and to provide a cost-optimized vehicle seat.

This problem is solved according to the invention by way of a seat assembly for a vehicle seat, in particular a motor vehicle seat, having a structural component with a plurality of stiffening ribs, an upholstery layer, an insert part which is arranged between the structural component and the upholstery layer, and also at least one component part which is fastened to the structural component. According to the invention, at least one fastening means is provided, wherein the at least one fastening means fastens the insert part to the structural component, and the at least one fastening means fastens the component part to the structural component.

By virtue of the fact that the at least one fastening means fastens the insert part to the structural component, and the at least one fastening means fastens the component part to the structural component, there is a reduction in the number of parts of fastening means. Adhesive bonding of the insert part to the structural component can be dispensed with.

The seat assembly may be embodied as a backrest. The seat assembly may be embodied as a seat cushion part. The seat assembly may be embodied as an armrest.

The structural component may be manufactured from a composite material. The structural component may be manufactured from a fiber composite material. The fiber composite material may comprise a thermoplastic matrix. The thermoplastic matrix may be reinforced with glass fibers and/or carbon fibers. The structural component may comprise a formed organosheet. The structural component may comprise a formed organosheet with stiffening ribs that are applied by injection molding.

The stiffening ribs may be formed in the direction of the upholstery layer. The stiffening ribs may be formed in the direction of the upholstery layer, starting from a two-dimensional region of the structural component. The structural component may have at least one fastening dome. The at least one fastening means may be fastened to the fastening dome. A fastening dome is to be understood as meaning a largely cylindrical or hollow-cylindrical region of the structural component, to which region at least one fastening means is fastened.

The upholstery layer may have a foam part. The upholstery layer may have a polyurethane foam part.

The insert part may be manufactured from a plastic. The insert part may be manufactured from an expanded polypropylene (EPP).

The insert part may have a plurality of grooves for receiving stiffening ribs of the structural component. The insert part may at least partially receive some of the stiffening ribs of the structural component. The insert part may at least partially receive all of the stiffening ribs of the structural component. The insert part may completely receive some of the stiffening ribs of the structural component. The insert part may completely receive all of the stiffening ribs of the structural component.

A side, facing towards the upholstery layer, of the insert part may be substantially smooth. A side, facing towards the upholstery layer, of the insert part may be smooth in certain portions. A side, facing towards the upholstery layer, of the insert part may have recesses for receiving at least one component part, in particular at least one cable. A side, facing towards the upholstery layer, of the insert part may be substantially smooth between the recesses.

The material stiffness of the structural component may be greater than the material stiffness of the insert part. The material stiffness of the insert part may be greater than the material stiffness of the upholstery layer. The material density of the structural component may be greater than the material density of the insert part. The material density of the insert part may be greater than the material density of the upholstery layer.

The at least one fastening means may be embodied as a fastening clip. The at least one fastening means may be embodied as a bolt. The at least one fastening means may be embodied as a rivet. The at least one fastening means may be embodied as a screw connection. The at least one fastening means may be embodied as an angle connector.

The at least one fastening means may have a clip foot for fastening the fastening means to the structural component. The clip foot may have one or more barbs. Barbs increase the connection strength.

The at least one fastening means may have a fastening part for fastening the component part to the at least one fastening means.

The at least one fastening means may have a shoulder for fixing the insert part to the structural component. The shoulder may project radially from a joining direction of the fastening means. The shoulder may be of two-dimensional configuration. The shoulder may have the shape of a membrane. The shoulder may be round. The shoulder may be oval. The shoulder may have any desired contour.

The component part may be a cable. The component part may be a cable of a cable harness. The cable or the cable harness may be used to supply electrical energy to actuators of the vehicle seat.

The component part may be a hose. The component part may have a hose. The hose may be a pneumatic hose. The hose may be a hydraulic hose.

The component part may be a component part of a supporting spring system. The component part may be a lumbar support. The component part may be a seat air conditioning system. The component part may be a component of a seat air conditioning system. The component part may be a fan motor of a seat air conditioning system.

The problem is also solved by way of a method for assembling a seat assembly according to the invention. By means of the method according to the invention, it is possible to reduce manufacturing costs and cycle times. Compared with bonded seat assemblies, the removal and exchange of parts, in particular the insert part, is also made easier.

The problem is also solved by way of a vehicle seat comprising a seat assembly according to the invention, in particular assembled by means of a method according to the invention. A vehicle seat comprising a seat assembly according to the invention can be assembled in a cost-effective manner. Further fastening means are also omitted compared with the prior art.

DESCRIPTION OF THE FIGURES

Before embodiments of the invention are described in more detail below with reference to figures, it must firstly be stated that the invention is not limited to the component parts described or the method steps described. Furthermore, the terminology used also does not constitute a restriction, but rather is merely exemplary in nature. Where the singular is used below in the description and in the claims, this also encompasses the plural in each case, unless this is explicitly ruled out by the context.

The invention is explained in more detail below on the basis of an advantageous exemplary embodiment illustrated in the figures. However, the invention is not restricted to this exemplary embodiment. In the figures.

DETAILED DESCRIPTION

Figure 1:
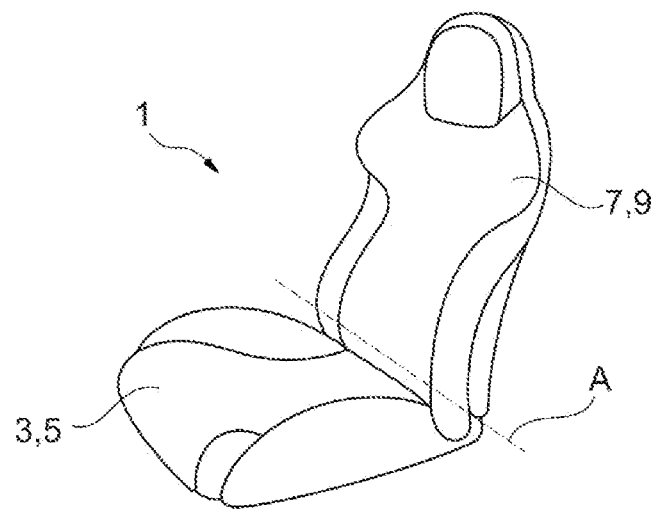
FIG. 1 shows a perspective view of a vehicle seat according to the invention.
Figure 2:
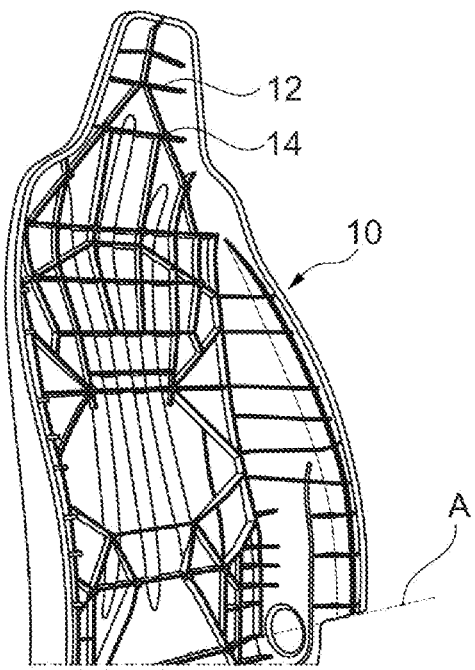
FIG. 2 shows, in a detail, a structural component of the vehicle seat.
Figure 3:
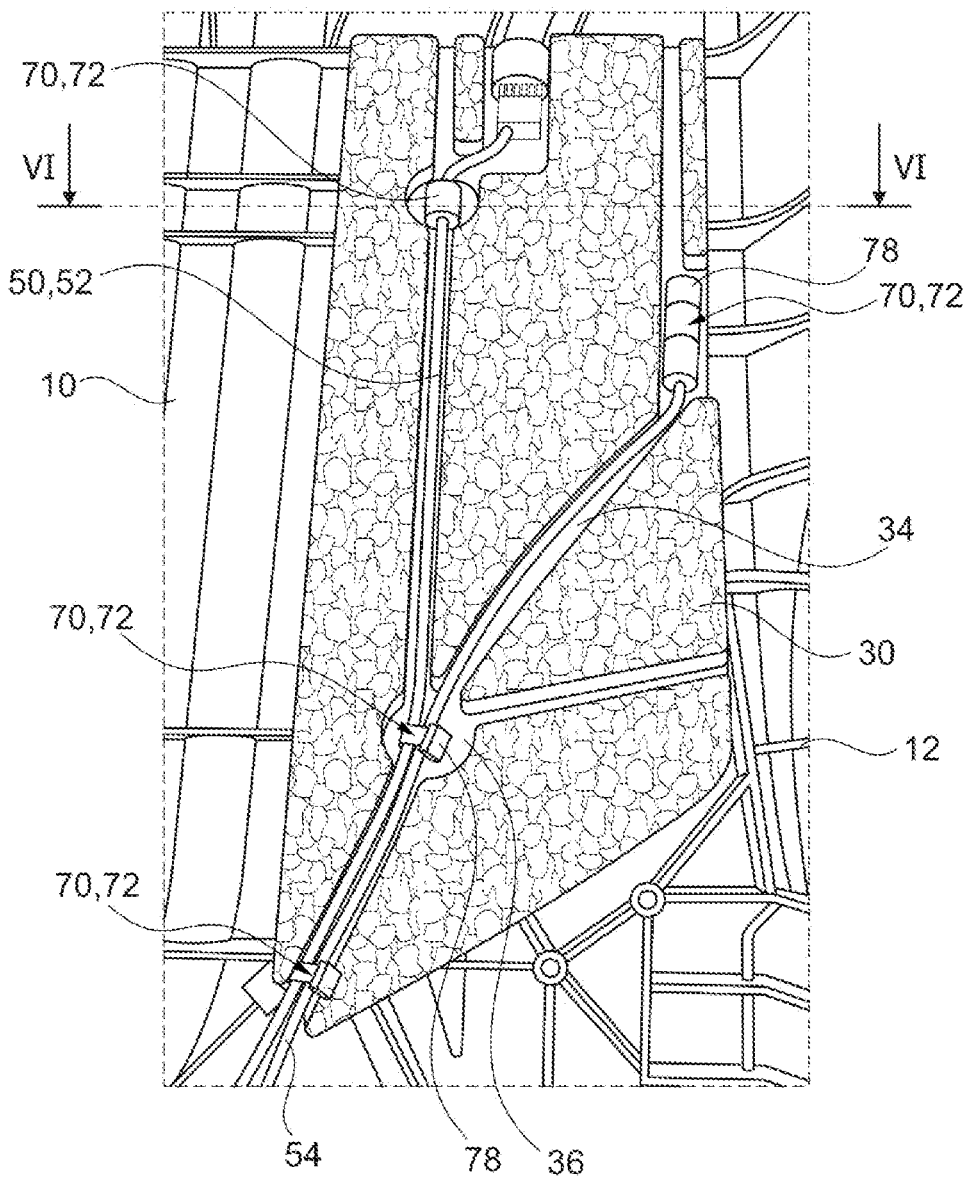
FIG. 3 shows, in a detail, an insert part which is fastened to the structural component by means of a plurality of fastening means in the form of fastening clips, and also a cable harness which is fastened to the fastening clips.
Figure 4:
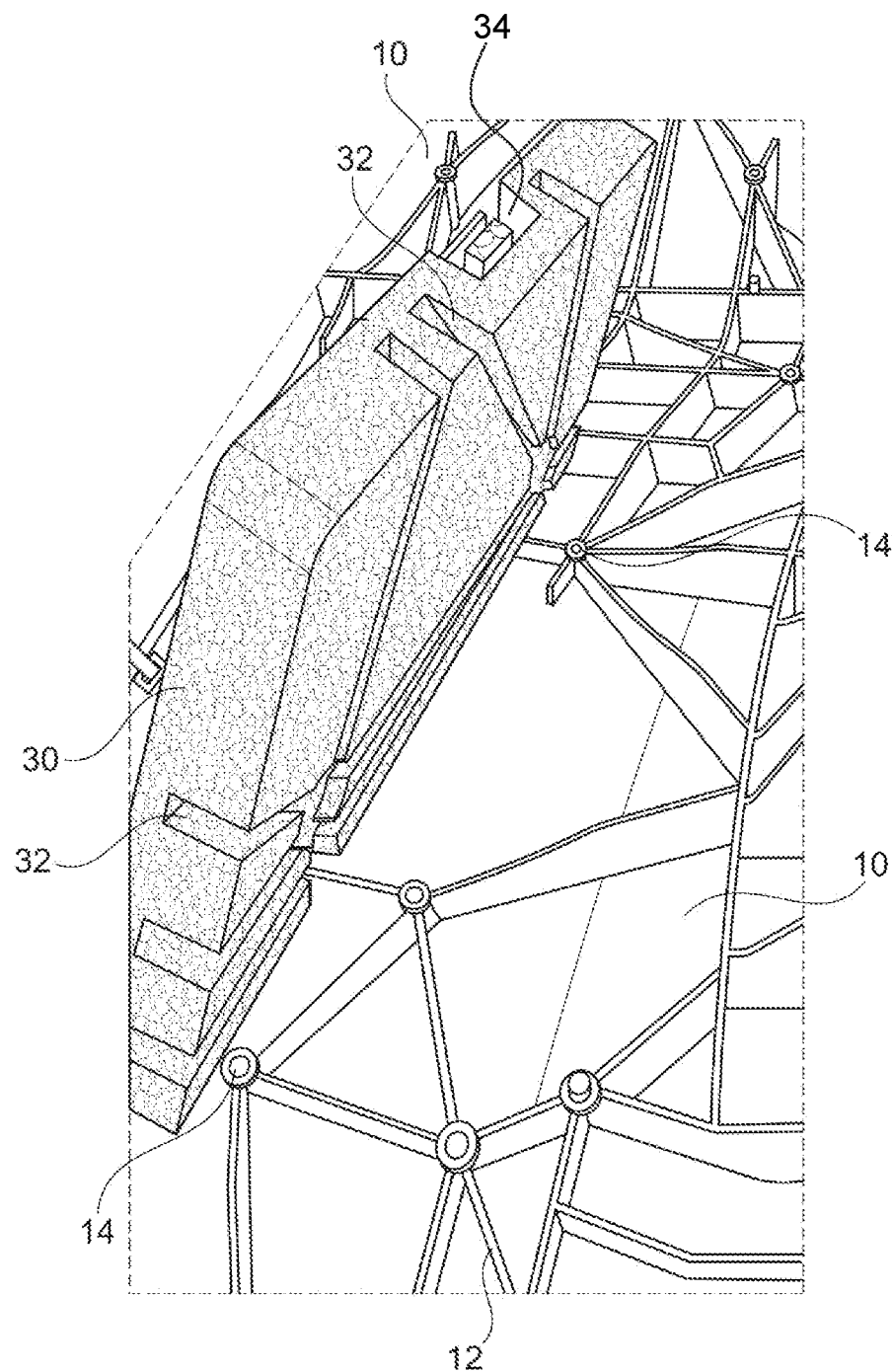
FIG. 4 shows, in a detail, the structural component and the insert part, wherein, in relation to a completely assembled state of the vehicle seat, the insert part is illustrated in a position pivoted relative to the structural component.
Figure 5:
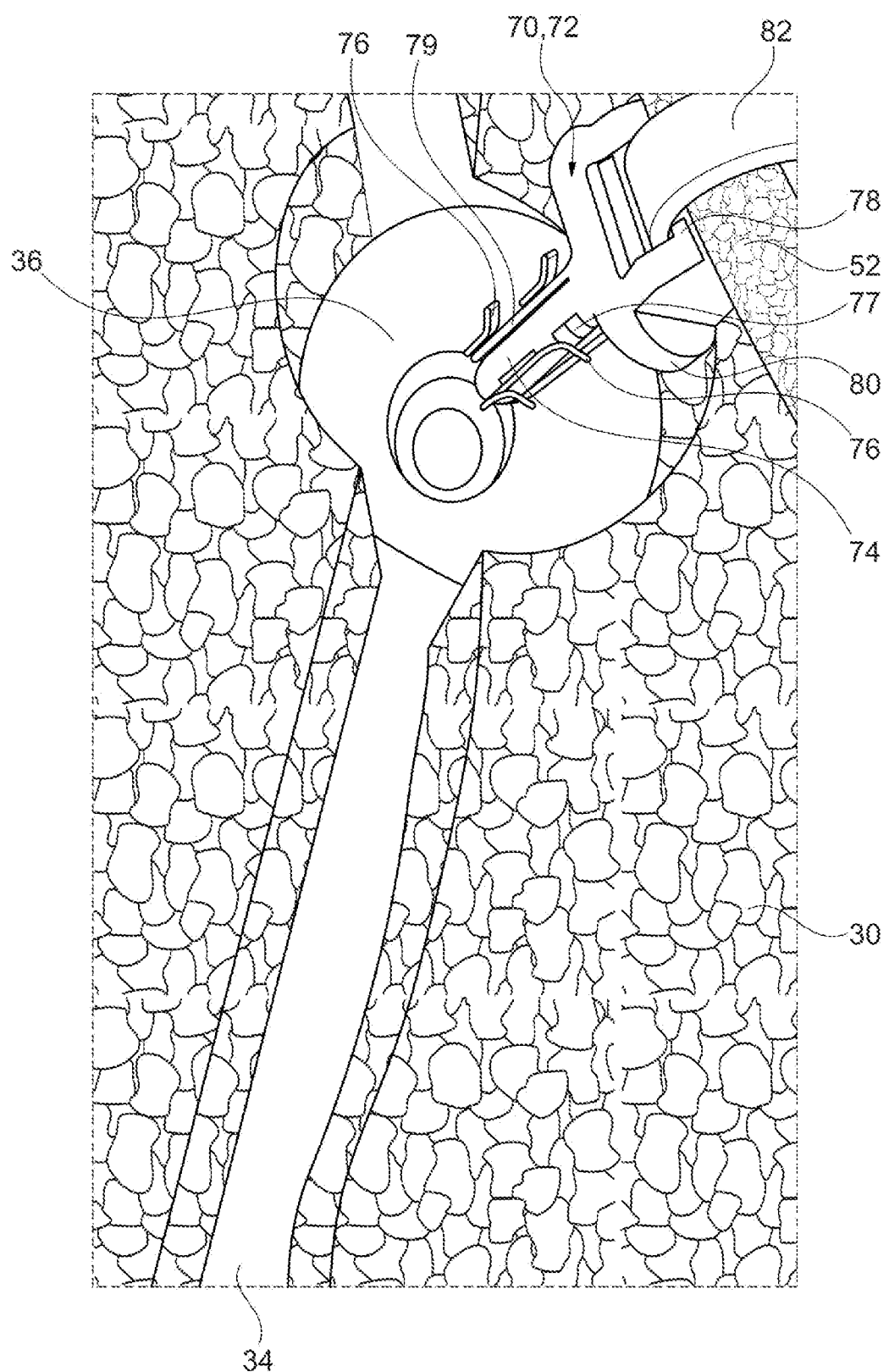
FIG. 5 shows, in a detail, the insert part, a fastening clip and a cable, which is fastened to the fastening clip, during the assembly of the vehicle seat, and FIG. 6 schematically shows a section along line VI-VI in FIG. 3.
Figure 6:
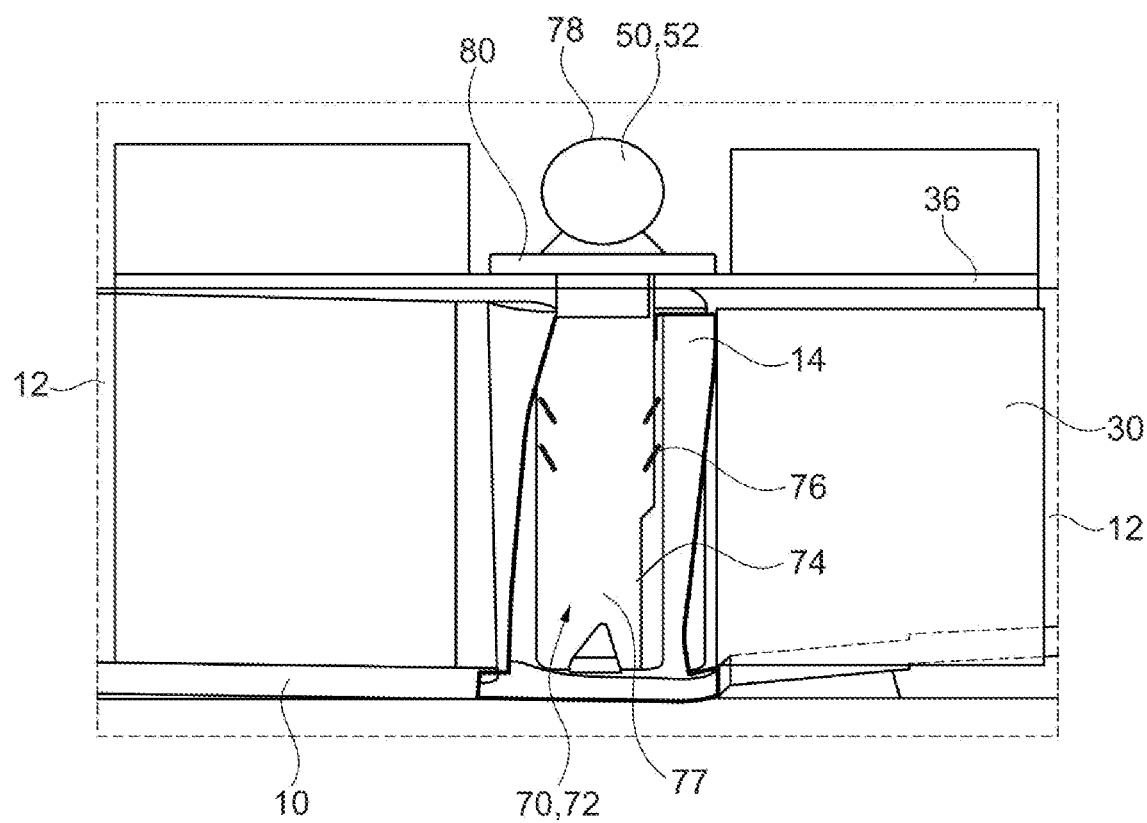

FIG. 1 shows a vehicle seat 1, in particular for a motor vehicle. The vehicle seat 1 has a seat cushion part 5 as a first seat assembly 3 and a backrest 9 as a second seat assembly 7. The backrest 9 is connected, for example by means of two fittings, to the seat cushion part 5 so as to be able to be adjusted in terms of inclination about a backrest pivot axis A. The seat assembly 7 embodied as a backrest 9 is described in detail below. In the present case, the seat assembly 3 embodied as a seat cushion part 5 is constructed in an analogous manner, but may also be constructed differently. In particular, the backrest 9 may be constructed in the manner described below, and the associated seat assembly 3 may be constructed differently.

The backrest 9 has an upholstery layer (not illustrated in the figures) which comprises a foam part, preferably composed of polyurethane foam, and also an upholstery cover, in particular composed of fabric or leather. The upholstery layer serves to comfortably support the seat occupant in the vehicle seat 1.

The backrest 9 also has, as supporting structure, a structural component 10 with a plurality of stiffening ribs 12. The structural component 10 is designed to support the upholstery layer, and also to be able to completely absorb use loads and crash loads and transmit them into a body structure of the vehicle via the seat cushion part 5. The structural component 10 is of substantially two-dimensional configuration on a side facing away from a seat occupant. Starting from the two-dimensional region of the structural component 10, the stiffening ribs 12 point in the direction of the upholstery layer. A plurality of stiffening ribs 12 intersect one another. Fastening domes 14 are formed in some of the intersection points of the stiffening ribs 12.

An insert part 30 is arranged between the structural component 10 and the upholstery layer. The insert part 30 is used to protect the upholstery layer against direct contact with the stiffening ribs 12. As a result, the stiffening ribs 12 cannot press into the upholstery layer, thus avoiding damage to the upholstery layer and increasing the seating comfort of the vehicle seat 1.

The insert part 30 has a plurality of grooves 32 for at least partially receiving the stiffening ribs 12 and the fastening domes 14. The form-fitting pairing of the stiffening ribs 12 with the grooves 32 also fixes the insert part 30 to the structural component 10. On that side of the insert part 30 which faces away from the structural component 10, the insert part 30 has a plurality of recesses 34 for receiving cables 52 of a cable harness 54. The cable harness 54 forms a component part 50 of the vehicle seat 1.

In addition to the fixing of the insert part 30 to the structural component 10 by means of the stiffening ribs 12 arranged in the grooves 32, the insert part 30 is fastened to the structural component 10 by means of a plurality of fastening means 70. In the present case, the fastening means 70 are embodied as fastening clips 72. The fastening clips 72 are also used to fasten the cables 52 of the cable harness 54 to the structural component 10 and in particular to fix the cables 52 in the recesses 34 of the insert part 30.

Each of the fastening clips 72 has a clip foot 74 with a plurality of barbs 76. The clip foot 74 is inserted into an opening of one of the fastening domes 14 of the structural component 10. The barbs 76 prevent the clip foot 74 from being able to come out of the fastening dome 14. The fastening clips 72 have a base body 77 composed of plastic. In the present case, the barbs 76 are composed of metal. The barbs 76 are constituent parts of a metal cage, which is fastened to the base body 77 in the region of the clip foot 74.

The fastening clip 72 also has a fastening part 78 for fastening a component part 50, in the present case a cable 52 of the cable harness 54. In the present case, the fastening part 78 is a embodied as an eye, through which a cable tie 82 runs and connects the cable 52 to the fastening part 78. In a modification of the exemplary embodiment, the cable tie 82 can be applied to the fastening part 78 by injection molding.

The fastening clip 72 also has a shoulder 80. A reinforcing plate 36, which is incorporated into the insert part 30, is fixed between the shoulder 80 of the fastening clip 72 and the associated fastening dome 14 in a form-fitting manner. To this end, the reinforcing plate 36 has a through-hole, the diameter of which is slightly greater than a diameter of the clip foot 74 and the diameter of which is smaller than a diameter of the shoulder 80. In a modification of the exemplary embodiment, the reinforcing plate 36 is omitted and the shoulder 80 of the fastening clip 72 bears directly against a step of the insert part 30.

The features disclosed in the above description, in the claims and in the figures may be of significance both individually and in combination for the realization of the invention in its various embodiments.

Although the invention has been described in detail in the figures and in the above illustration, the illustrations are to be understood as being illustrative and exemplary and non-restrictive. In particular, the selection of the proportions of the individual elements illustrated in the drawing is not to be interpreted as being necessary or restrictive. Furthermore, the invention is in particular not restricted to the exemplary embodiments discussed. Further variants of the invention and of the embodiment thereof emerge to a person skilled in the art from the preceding disclosure, from the figures and from the claims.

Expressions such as "comprise", "have", "contain", "encompass" and the like used in the claims do not rule out further elements or steps. The use of the indefinite article does not rule out a multiplicity. A single device may perform the functions of several of the units or devices mentioned in the claims.

LIST OF REFERENCE DESIGNATIONS

1 Vehicle seat
3 Seat assembly
5 Seat cushion part
7 Seat assembly
9 Backrest
10 Structural component
12 Stiffening rib
14 Fastening dome
30 Insert part
32 Groove
34 Recess
36 Reinforcing plate
50 Component part
52 Cable
54 Cable harness
70 Fastening means
72 Fastening clip
74 Clip foot
76 Barb
77 Base body
78 Fastening part
79 Cage
80 Shoulder
82 Cable tie
A Backrest pivot axis

The invention claimed is:

1. A seat assembly for a vehicle seat, comprising:
   a) a structural component with a plurality of stiffening ribs,
   b) an upholstery layer,
   c) an insert part which is arranged between the structural component and the upholstery layer,
   d) at least one component part which is fastened to the structural component,
   e) at least one fastening means, wherein the at least one fastening means fastens the insert part to the structural component, and the at least one fastening means fastens the component part to the structural component,
   wherein a material stiffness of the structural component is greater than a material stiffness of the insert part, wherein the material stiffness of the insert part is greater than a material stiffness of the upholstery layer.

2. The seat assembly as claimed in claim 1, wherein the seat assembly is embodied as a backrest.

3. The seat assembly as claimed in claim 1, wherein the structural component is manufactured from a fiber composite material.

4. The seat assembly as claimed in claim 3, wherein the fiber composite material comprises a thermoplastic matrix which is reinforced with glass fibers and/or carbon fibers.

5. The seat assembly as claimed in claim 1, wherein the structural component comprises a formed organosheet with stiffening ribs that are applied by injection molding.

6. The seat assembly as claimed in claim 1, wherein the structural component has at least one fastening dome to which the at least one fastening means is fastened.

7. The seat assembly as claimed in claim 1, wherein the insert part is manufactured from an expanded polypropylene.

8. The seat assembly as claimed in claim 1, wherein the insert part has a plurality of grooves for receiving stiffening ribs of the structural component.

9. The seat assembly as claimed in claim 1, wherein the at least one fastening means is embodied as a fastening clip.

10. The seat assembly as claimed in claim 1, wherein the at least one fastening means has a clip foot for fastening the fastening means to the structural component, including wherein the clip foot has a plurality of barbs.

11. The seat assembly as claimed in claim 1, wherein the at least one fastening means has a fastening part for fastening the component part to the at least one fastening means.

12. The seat assembly as claimed in claim 1, wherein the component part is a cable, including a cable harness.

13. A method for assembling a seat assembly, comprising:
   a) providing a structural component with a plurality of stiffening ribs,
   b) providing an upholstery layer,
   c) providing an insert part which is arranged between the structural component and the upholstery layer,
   d) providing at least one component part which is fastened to the structural component,
   e) providing at least one fastening means, wherein the at least one fastening means fastens the insert part to the structural component, and the at least one fastening means fastens the component part to the structural component, wherein the insert part is fastened to the structural component by means of the at least one fastening means, and in the same method step or a subsequent method step or a preceding method step, the at least one component part is fastened to the at least one fastening means, wherein a material stiffness of the structural component is greater than a material stiffness of the insert part, wherein the material stiffness of the insert part is greater than a material stiffness of the upholstery layer.

14. A vehicle seat comprising a seat assembly assembled by means of a method as claimed in claim 13.

* * * * *